E. O. BENJAMIN.
ELECTROLYTIC APPARATUS.
APPLICATION FILED AUG. 1, 1917.
1,344,220.
Patented June 22, 1920.
4 SHEETS—SHEET 2.
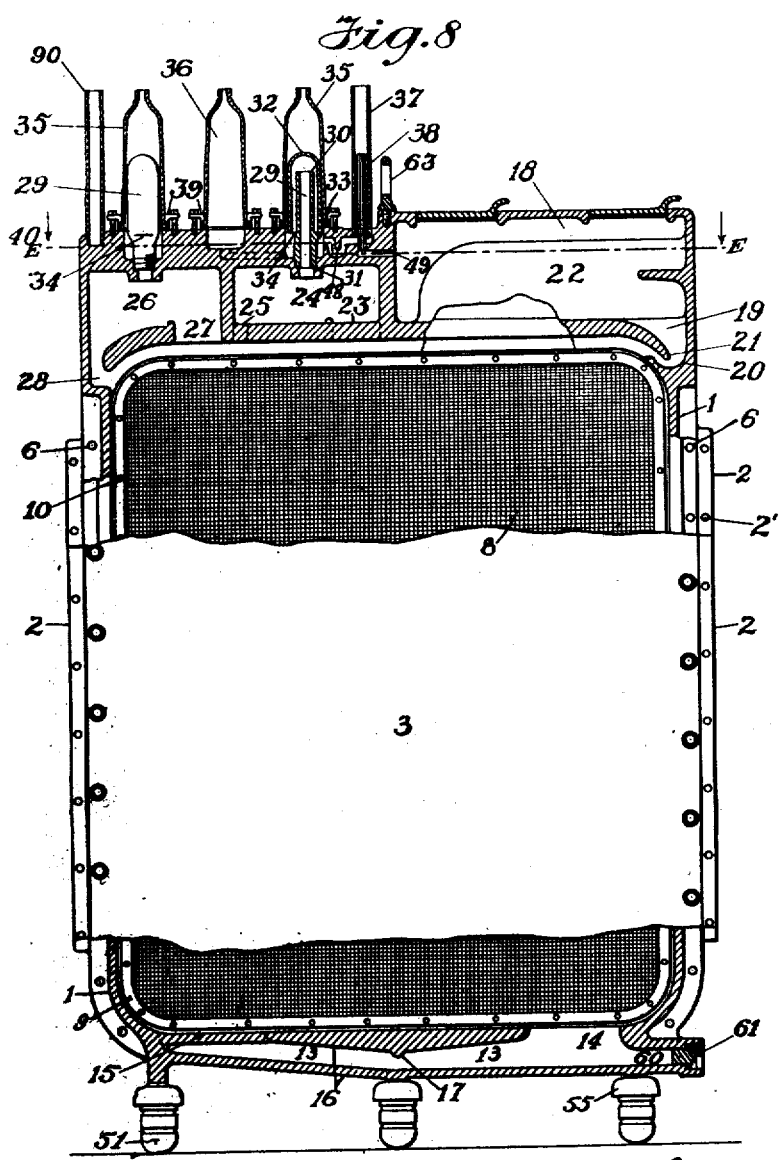
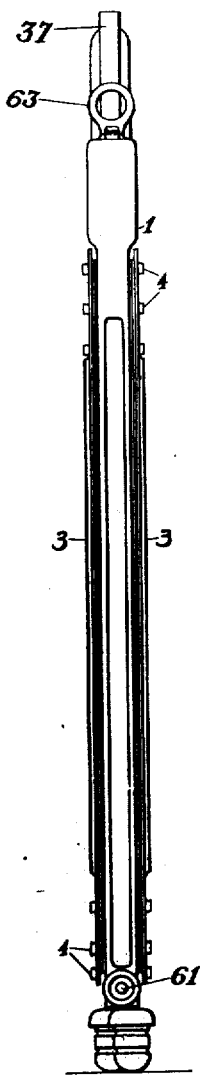
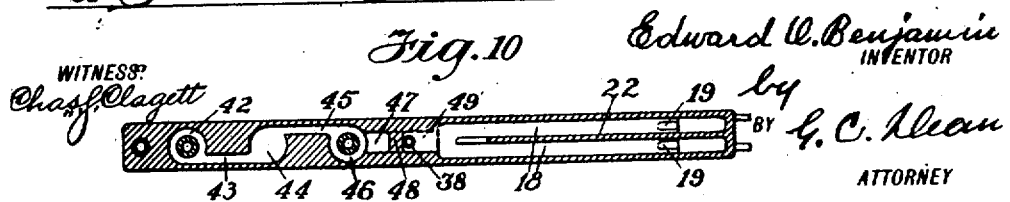

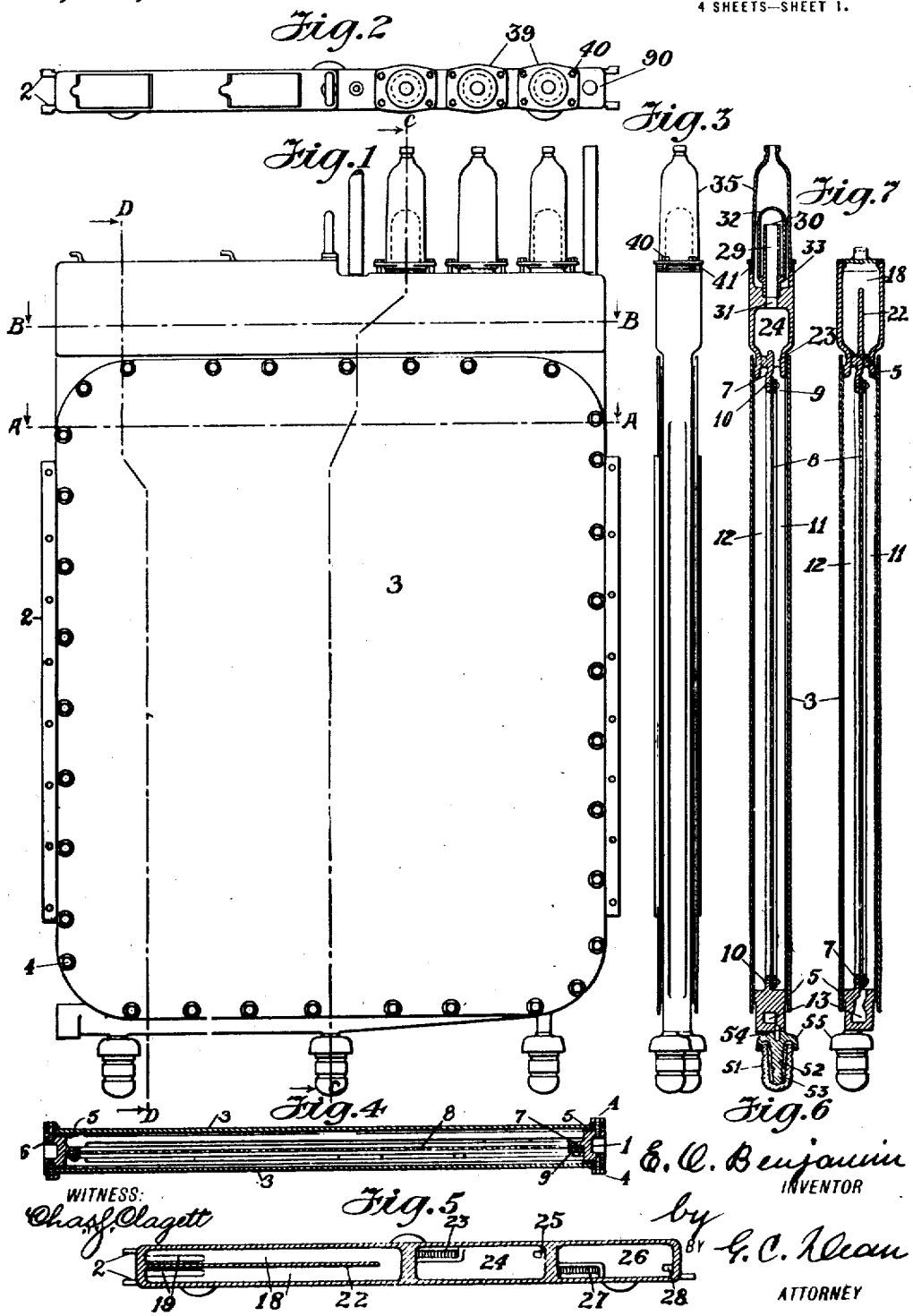

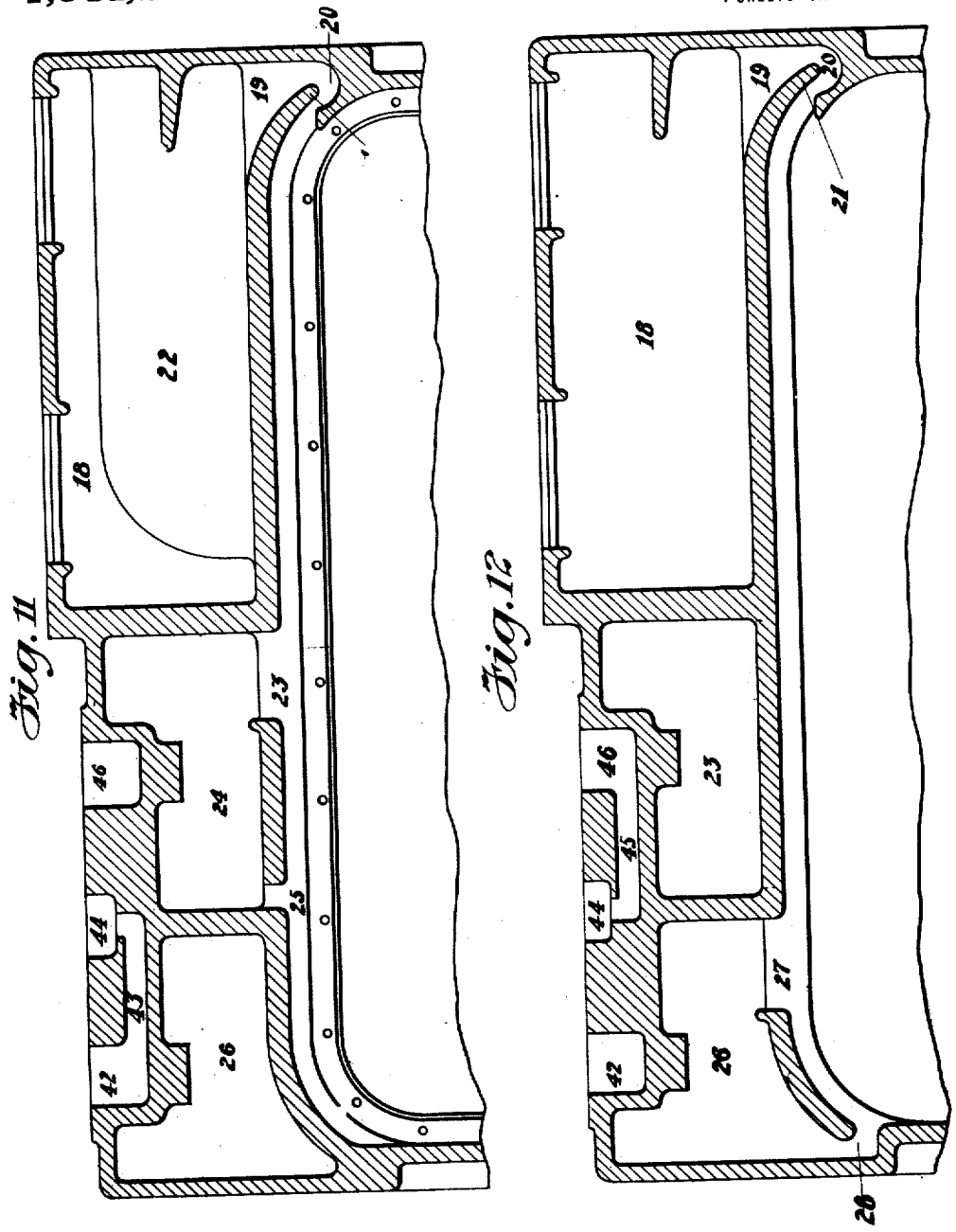

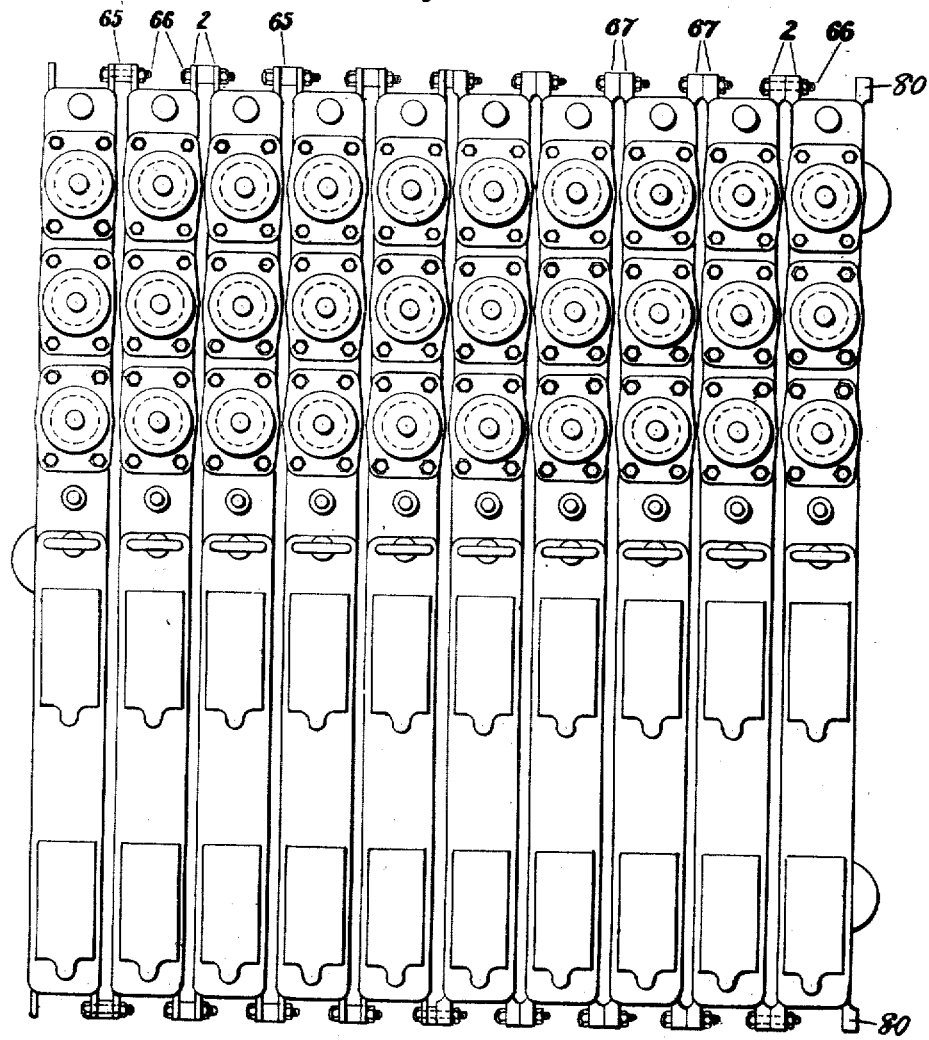

UNITED STATES PATENT OFFICE.

EDWARD O. BENJAMIN, OF NEWARK, NEW JERSEY, ASSIGNOR TO INTERNATIONAL OXYGEN COMPANY, OF NEW YORK, N. Y., A CORPORATION OF NEW JERSEY.

ELECTROLYTIC APPARATUS.

1,344,220.  Specification of Letters Patent.  Patented June 22, 1920.

Application filed August 1, 1917. Serial No. 183,828.

*To all whom it may concern:*

Be it known that I, EDWARD O. BENJAMIN, a citizen of the United States, and resident of Newark, in the county of Essex and State of New Jersey, have invented certain new and useful Improvements in Electrolytic Apparatus, of which the following is a specification.

My present invention is embodied in an apparatus particularly designed for the purpose of decomposing water for the purpose of producing approximately pure oxygen gas and approximately pure hydrogen gas for various industrial and commercial purposes and although certain features of my invention may be capable of useful employment in other connections or for other or additional purposes, I will describe it in connection with the said purpose for which it was primarily intended.

Apparatus for the above purpose comprises essentially two electrodes and an intervening body of water rendered conductive as for instance by a suitable percentage of acid, salt or base such as soda, potash or similar material. It has been common to employ electrodes of large area and also a separating member in the electrolyte between the electrodes made of material adapted to resist and, substantially, to prevent mingling of the hydrogen generated on the surface of one electrode with the oxygen generated on the surface of the other electrode or vice versa, while not preventing free electrolytic conduction of the current between the electrodes.

Among the objects of my invention may be mentioned organizing the above mentioned essential elements as a self-contained unit which, though it may be used alone, is adapted to be compactly assembled with and rigidly secured to any desired number of other similar units; to do this in such a way as to insure electrical efficiency and economy and minimum heat radiation as well as economy of floor space and mechanical strength; to have the assembly arrangement so that when necessary or desired, any cell or cells may be cut out of operation and may be physically removed from intermediate positions in the battery, without any interference with the mechanical assembly or electrolytic functioning of the other cells of the battery. To this end, the cell is made thin and self-contained, is provided with attached glass insulating supports and a ring-bolt above its center of gravity whereby it may be lifted and moved out of assembly.

The cells are preferably similar and each cell consists essentially of a frame which acts as a body, containing all the passageways and regulating devices for maintenance and operation of the cell. The open space within this frame is closed in on each side by the large area metallic plates which serve as the electrodes.

Within the frame and midway between the plate electrodes, is a diaphragm clamped about its entire margin to a flange or ledge on the frame and adapted to serve as a gas-tight separating medium between the two gases, while permitting free passage of the current therethrough. Other features are making the plate electrodes parallel and close together so that the body of electrolyte between them may be relatively small, saving space, decreasing resistances and making the path of the current in the electrolyte short; arranging electrodes substantially parallel so that the flow of current between the electrodes and its surface density on the electrodes will be substantially uniform; arranging the cell structure, water supply, gas outlets, etc., so that the gas generating space within the cell will be completely filled with electrolyte except for the gas in formation or transition, and all electrode surfaces exposed within the cell will be useful gas generating surfaces and there will be no non-generating surfaces such as would be liable to waste energy by reversing and acting as a gas battery; the entire area of the separating medium or asbestos diaphragm will be entirely below the level of the liquid and will be fully and completely wetted thereby and so serve effectively its function as a gas seal between the oxygen generating compartment and the hydrogen generating compartment; arranging for a continuous rigid clamp about the entire border of the diaphragm thus rendering it gas-tight at the edges without necessity of using any rubber border or gasket, which, as experience shows, would greatly lessen the life of the diaphragm; assembling the gas collecting arrangements, pressure vents, reservoir, etc., so that they are closely adjacent and conveniently located; providing separating chambers for the respective gases in which the gas will separate out from the electrolyte foam and the water vapor will be condensed therefrom.

By making each cell a separate self-contained unit, the electrolytic liquid in each cell is isolated from that in any of the others so that there can be no danger of electrolytic conductivity between different cells of the same battery, and no danger of forming secondary electrode areas of unlike polarity whereby undesirable quantities of hydrogen may be produced in the region where only oxygen should be and vice-versa, etc.

This formation of secondary or localized poles of unlike polarity generating unlike gases in both of the compartments where only one gas should be, is a dangerous possibility even in self-contained unit cells, but I avoid it in my present construction, as will be explained.

My unitary cell consists of three members which are of metal and hence are good electrical conductors. They are the two electrode plates forming the two main walls of the cell and the intermediate frame constituting the top, bottom and sides thereof. The electrode plates are bolted to this frame with intervening non-conducting water-tight, gas-tight gaskets. With such a construction, the frame being of conducting material and located between the electrodes and in electrical contact with the conducting electrolyte is in favorable position to short circuit part of the current. If it did so, the points where the current would naturally enter and leave the frame would be of opposite polarity from the main electrode in the same compartment and hence would generate the wrong kind of gas in both compartments.

This I avoid by taking advantage of the well-known fact that the electrical pressure or voltage required to initiate and maintain flow of current through one pair of electrodes and the intervening electrolyte has a certain critical value and this voltage, called the decomposition voltage is always the same for any given electrolyte, electrodes and cell. This minimum voltage which will force current to flow across one pair of electrodes must be doubled in order to force current to flow successively across two pairs of electrodes. Hence a voltage which will force current between the main electrodes of my cell, must be doubled before any current whatever can flow into and out of the frame since such flow would require the formation of an additional pair of electrodes and a generation of gas at the four successive transition points, all within a single cell. Hence, I am free to operate my cell at any desired voltage between its minimum decomposition voltage and double the decomposition voltage, without danger of any current flowing in the frame. For instance, if the critical minimum voltage for a given cell is 1.5 volts, the safe operating range for that cell will be say 1.6 to 2.9 volts.

An important feature of my invention is arranging for circulation of the electrolyte from the hydrogen side of the asbestos diaphragm to the oxygen side thereof without danger of carrying entrained hydrogen to the oxygen side or vice versa. This is accomplished by arranging an offset passage in the bottom of the frame of the cell descending from one extreme edge of the hydrogen side downward, beneath the asbestos partition and emerging at the extreme opposite edge of the oxygen side of the partition. Circulation through this passage is extremely slow and the gas has abundant time to separate especially when the circulation is due to a gradual increase in the specific gravity of the electrolyte on the one side of the partition. The lighter liquid which is thus displaced upward on the other side is permitted to flow freely but slowly through passages in the top of the frame, described hereinafter, over to the opposite side of the diaphragm. This freedom of circulation of the liquid in response to unequal changes in its specific gravity increases the efficiency and uniformity of the gas producing action of the current and also prolongs the life of the asbestos diaphragm. I believe I am the first to produce a cell unit in which there is successfully maintained a circulation of electrolyte between the oxygen and hydrogen sides of the diaphragm without passing through the diaphragm.

By the above and other hereinafter described features of my invention, I am able to operate my cell for very long periods of time, producing the maximum output of hydrogen and of oxygen with great economy of current and both gases are of extreme purity, that is better than 99.5% pure.

My invention also includes arranging in the frame the gas collecting and pressure maintaining instrumentalities including the collection chambers, pressure maintaining water-seals, vents, etc., for each of the gases as well as the return passages for overflow of the liquid from compartment to compartment, and from the water seals, in combination with a supply reservoir for replacing the water content of the electrolyte as fast as it is used up and turned to gas by the electrolytic dissociation. This part of the system includes intercommunicating passages between gas collecting chambers, water seals, gas vent, stand pipe and the reservoir, from which latter the liquid passes into the main body of electrolyte in the cell, through a water-sealed trap adapted to prevent reverse passage of the gaseous products. The reservoir has two independent outlets into the cell, one on each side of the diaphragm.

so that inequality in hydrostatic pressure on the latter is avoided. These two outlets, though closely adjacent are guarded from direct passage of liquid from one side of the diaphragm to the other through the reservoir by arranging an extensive partition between them thereby causing any cross-flowing liquid to traverse a very long path so that it will have time to thoroughly free itself from any entrained gas before it passes into the other compartment, where such gas would constitute a dangerous impurity.

These parts are organized so that the danger point of low level of the electrolyte is indicated by bubbling of gases out through the reservoir, while the danger point of pressure is indicated by the bubbling of gases out through the pressure vent. I prefer to use no insulating material of a low melting point, such as paraffin within the cell or any portion of the cell. Also no material readily decomposed by the electrolyte as glass or porcelain or material adapted to deteriorate before other parts of the apparatus, such as rubber.

Neither of the electrodes contains any of the passageways for the supply of the electrolyte to be dissociated nor for the carrying off of the gas, and neither electrode is suspended in the electrolyte.

By making the cell thin as well as self-contained and arranging for complete submergence of the diaphragm and all electrode surface exposed within the cell, it is rendered particularly adapted for use on shipboard, where, by setting the cell flatwise to the direction of lateral rolling of the ship, and endwise to the direction of longitudinal pitching, it becomes perfectly usable under all conditions of average or even very rough weather at sea. For this use, as well as any other use, the cell will stand tilting to an angle of say 35° laterally and say 20° longitudinally without any substantial danger.

The above and other features of my invention will be more fully understood from the following detailed description of a desirable embodiment thereof in connection with the accompanying drawings in which,—

Figures 1, 2, 3 and 9 are respectively side, top and end elevations of the complete cell;

Figs. 4 and 5 are horizontal sections on the lines A—A and B—B of Fig. 1;

Figs. 6 and 7 are vertical transverse sections on the line C—C and D—D, Fig. 1;

Fig. 8 is a central longitudinal vertical section with certain parts shown in side elevation;

Fig. 10 is a horizontal section on the dotted line E—E, Fig. 8 which is broken to different levels in order to show in one view the continuity of the intercommunicating passages;

Figs. 11 and 12 are parallel vertical sections through the top of the frame showing the entire construction;

Fig. 13 is a top plan view showing a number of my standard unit cells assembled as a battery.

The cell as shown in these drawings comprises the rectangular frame 1, which constitutes the top, ends and bottom of the cell. The frame is preferably of cast iron adapted to resist the action of electrolytes such as potash, and is preferably formed as a single integral casting. The large central opening in the frame is boxed in on either side by large metal plates 3, 3, preferably of cast iron, which are applied against the opposite sides of the frame and screwed tightly down upon an intervening gasket 5 of any suitable non-conducting material adapted to render the joint air-tight and gas-tight. The bolts 4, 4 screw into the frame 1, which, at the sides, is provided with flanges 6, 6 for this purpose. The inner surfaces of the plates 3, 3 are utilized as the working electrodes and hence the heads and shanks of these bolts must be insulated from the plates 3, 3 by insulating bushings or otherwise so as not to form a metallic conducting path for the current from plate to plate through the frame without passing through the electrolyte within the cell.

Electrode plates are extended at the edge to form electrical terminals 2 of ample area for contact with the terminals of the conductors through which they are to be supplied with current and for distributing said current along the entire edge of the electrodes. The terminals may be securely bolted either to conductors from the source of power or to those of an adjacent cell of the same battery through holes 2' which are provided for this purpose. Special provisions for the latter purpose are described hereinafter.

A flange 7—7 preferably cast integral with the frame, projects inwardly within the opening of the frame in position to support the diaphragm 8 which is secured to it by a rectangular marginal clamp 9 secured by bolts 10 so that the diaphragm is in position to divide the interior of the cell vertically into two parallel compartments. The diaphragm is preferably of heavy, closely woven asbestos fabric, wire gauze, or other porous material adapted to prevent gas bubbles or electrolyte containing them from passing transversely from one compartment into the other without affording any obstacle to the passage of the electric current in the electrolyte. By this means, the hydrogen generated on the inner face of one of the plate electrodes will remain in its compartment or the oxygen generated at the other electrode will remain in its compartment. These gases may be generated on either one of the plate electrodes according to the polarity of the connection to the source of electric current but as the bolts 10 and the clamping frame 9 are not very resistant to the action of nascent oxygen, I prefer to make the polarity such that the hydrogen will be generated in the compartment 11 where these parts are located, the oxygen being generated in the chamber 12 where it will be kept away from them by the diaphragm 8.

Since the process of gas production operates to increase the specific gravity of the electrolyte in one of the compartments, there is a tendency for the heavier liquid to flow through the diaphragm, say from compartment 11 to compartment 12 at the bottom and from compartment 12 to compartment 11 at the top or vice versa. Such circulation through the diaphragm tends to impair its gas-proof integrity so that in course of time, it may permit considerable quantities of the respective gases to be carried through into the wrong compartment. The bubbling up of the gases, agitation or anything tending to produce unequal pressures on opposite sides of the diaphragm will have a similar effect. To avoid these objections, I provide special means whereby the electrolyte may circulate freely from one compartment to the other without passing through the diaphragm and without carrying any gas with it. For this purpose, I provide the bottom of the cell with an unobstructed passage of considerable length extending from one compartment to the other. This is preferably in the form of a hollow passage 13 cast in the bottom of the frame leading from an opening 14 in one end of the bottom of one compartment, lengthwise along the frame and upward through the other end as the bottom of the other compartment as indicated in dotted lines at 15, Fig. 8. The upper surface or roof of the passage slopes downward as at 16 from each opening to a baffle projection 17. Any gas contained in the liquid circulating in this passage has ample time to separate out and work backward along the sloping roof and return through the opening into the compartment from which it came, so that none of it is carried forward with the electrolyte into the other compartment.

The return circulation is through the reservoir 18 formed in the top of the casting, the two supply openings for the opposite sides of the diaphragm being utilized for this purpose. These openings 19, 19 terminate in a recessed portion 20, Fig. 8, which in conjunction with the downwardly curving lip 21 affords a water-seal against direct escape of gas from the top of the cell. 21 also acts as a collecting and separating surface for bubbles in any electrolyte which may circulate back through this opening 19. The reservoir is provided interiorly with a relatively long partition 22 extending above the level of the liquid therein so that any liquid circulating from one compartment to the other through the reservoir must traverse a relatively long path and must be preferably separated from suspended gases. The arrangements for separately collecting and leading off the substantially pure oxygen and pure hydrogen formed in the respective compartments 11 and 12 are formed in the top of the frame adjacent the reservoir. The hydrogen bubbling up through the electrolyte passes into the collecting chamber 24 through the opening 23 shown in dotted lines in Fig. 8 and full lines in Fig. 6. As the hydrogen is extremely light and is formed in double quantity, the movement of the electrolyte may be very active and for this reason, I prefer to form the chamber 24 with a separate exit 25 for freer escape of the electrolyte after the hydrogen has separated from it in the collecting chamber.

The oxygen-producing compartment communicates with the collecting chamber 26 through the entrance 27 and exit 28, shown in full lines on Fig. 8. The exit 28 is on a lower level than 27 and this facilitates one way circulation because the electrolyte settling out of oxygen foam is peculiarly heavy and will flow readily down and out at 28.

The respective gases pass onward through separate, preferably similar, water seals 29, 29, whence they are piped to the respective storage reservoirs.

The water seals comprise an upwardly extending pipe 30 screwed into the uptake opening 31 and having preferably cast integral therewith a bell or dome 32 connected to it by one or more brackets 33 which leave a peripheral downward opening 34 below the normal level of liquid and constituting a water seal through which the gas is forced. Surrounding this is an outlet chamber 35 which may be of glass for ready observation.

The water seals are connected by suitable passages described hereafter with a vent chamber 36 preferably of glass and a stand pipe 37 preferably of iron having an overflow pipe 38, the height of which determines the hydrostatic pressure in the water seals and their pressure, transmitted backward through the gas and liquid in the collecting chambers 24, 26 controls the pressure in the interior of the cell. Chambers 35 and 36 when of glass are preferably secured in place by clamps 39 and bolts 40 with intervening gas and water-tight gaskets 41.

The arrangements and the connections for circulation of electrolyte carried upward by the gases are in different planes and on different levels, and are best comprehended by reference to the horizontal section in Fig. 10 which is broken to different levels so as to show at a glance the path of the liquid. The precise details of the levels and planes in which these passages extend are accurately shown in the true-plane longitudinal sections of Figs. 11 and 12. Referring for convenience to Figs. 8 and 10, it will be seen that the gas carrying with it more or less moisture, passes up through pipe 30 and bubbles down through the water seal opening 34 into the annular space 42 in the frame casting, the gas escapes through the open top of chamber 35 while any excess liquid flows through the passage 43 into the base of the vent chamber 44; thence through passage 45 into the annular space 46 at the base of the water seal of the other gas collecting chamber 24; thence through opening 47 and downwardly under the baffle 48 to the base of the stand pipe 37. From the stand pipe 37 the path is downward through the overflow pipe 38 through passage 49 into reservoir 22.

With the above connections, it will be obvious that both water seals are in hydrostatic connection with the stand pipe 37 and with the gas vent 36; also that excess pressure from either water seal will discharge through the vent 36; pressure from the intermediate water seal discharging backward through passage 45, recess 44 and gas vent 36.

It is obvious that the last described circulatory system affords a pressure path from one gas producing compartment to the other, but the electrolyte will not equalize through this connection because of the water seal checks which prevent such operation. Any excess pressure which might tend to blow oxygen back or hydrogen forward through passages 43, 45 and the common vent chamber 36 is prevented by the peculiar arrangement of the passages whereby 43 and 45 enter the recess vertically upward on opposite sides thereof and whatever force there may be in such flow, takes effect directly upward and has the effect of driving the gas to the surface of the liquid in the vent chamber 36, whence it will escape to the air in preference to turning downward as it would have to do to enter the passage to the other water seal.

The stand pipe 37 is in position to serve as protection for the glass chambers 35, 36 and for a similar purpose, I have arranged a vertical rod or metal stud 90 at the opposite end of the row of said chambers.

Cells of the above described construction may be insulated in any desired way but I prefer the insulators which are shown in the drawing as being three in number and arranged in staggered relation. These afford three point support for each cell and they are so located that insulators of adjacent cells will not contact with each other when assembled in the battery as hereinafter described. Each insulator comprises an insulating shell 51 preferably of glass secured over a stud 52, preferably of iron, by moldable material 53, preferably non-conducting, and the stud 52 is preferably formed integral with an overhanging petticoat 55 of iron which serves as a roof to shed any down-flowing electrolyte out of contact with the sides of the glass insulator. The cast iron is not readily attacked by the potash commonly used in the electrolyte and the petticoat therefore protects the glass from damage thereby. The stud and petticoat casting is secured to the frame 1, in any desired way, as for instance, by screw stud 54. These insulating supports raise the bottom of the cell above the floor and afford space for manipulating the arrangements for drawing off the electrolyte, these latter constituting a very useful feature of my invention. They consist of a passage 60 communicating with the circulating passage 13 and through it with the openings 14, 15. The outlet is closed by a screw plug 61 and there is exterior to the latter an enlarged screw threaded opening for attachment of a pipe elbow or other suitable fitting for drawing off the electrolyte.

One object in rigidly attaching the insulators to the cell is to make it readily transportable for various purposes, as for instance, to move it into and out of position between other cells and to facilitate such operation I provide a ring bolt 63 in the top of the frame in the line of center of gravity of the cell.

The cells have certain special features of construction whereby they are adapted for assembly in a battery, as indicated in Fig. 13. By reference to this figure, it will be seen that the cells are placed parallel with each other but out of physical contact, except that the side edge extension 2 of the plate electrodes of each cell are rigidly bolted to the corresponding extension 2 of the adjacent electrode plate of the adjacent cell. The spacing out of physical contact and the avoidance of any solid heat insulating material between or around adjacent electrodes, decreases liability of forming local conducting bridges by spilled or escaped electrolyte, which might operate to concentrate the current path on some one locality of an electrode and thus overheat the same. The spacing is, however, reduced to the minimum in order to decrease heat losses by having the heated plates closely adjacent and in contact with a relatively small body of intervening insulating air. The required spacing may be attained where flat electrode plates are used, by interposing a spacing bar 65 of good conducting material, and through-bolting the plates into intimate electrical contact therewith by bolts 66. In other cases the plates may be cast with raised bearing surfaces as at 67 so that they may be bolted directly together without interposition of any spacing bar.

The bolts that hold the electrodes to the frames, are arranged unsymmetrically on the top row with respect to the bottom row and in one of the side rows with respect to the other side row so that, as shown in Fig. 1, none of the bolt heads in one side row are on the same level with bolt heads in the other side row, and none of the bolt heads in the top row are vertically in line with the bolt heads in the bottom row. By using the same pattern for spacing of bolt heads on the opposite faces of the cell but reversing it, so that in this particular, they are "rights" and "lefts," unlike sides of similar cells may be placed in close relation without the possibility of the bolt heads of one contacting with the bolts of the other, even though the spacing be less than the total projection of the two sets of heads.

By arranging the extension 2 to extend along the entire edge of the electrode, 1 greatly reduce the resistance and by having them on both sides of the plate, the resistance in the case of cast iron is about one-quarter what it would be with the extension used on one edge only.

By the above arrangement, the entire path of the current through a battery is of the lowest possible resistance and hence a much greater percentage is utilized to perform the useful work of generating gas.

With my construction, the operation of the cell may be kept under constant observation, and whenever trouble is indicated in any one or more of them, it may be readily short-circuited, unbolted from the adjacent cells, a hook from an overhead crane inserted in the ring bolt 63, and the entire cell with attached insulators and contained electrolyte lifted and conveyed to a suitable location for investigation or repair and when repaired, may be replaced, all without interfering with the operation of the remaining cells of the battery.

The end cells may be connected with the source of power by parallel bar strip terminals as 80, which may be of copper.

Thus, while my invention contemplates a novel self-contained cell capable of entirely separate and independent operation, many of its novel features are of peculiar advantage for its preferred use as a quantity hydrogen and oxygen producing plant wherein a plurality of independent thin metallic tanks containing separate non-conducting bodies of electrolyte may be connected up in a battery, each unit of which consists of a thin cast iron frame, gas isolating diaphragm supported by the frame and opposite insulated flat walls closing in the cavity within the frame and below the level of the electrolyte therein so that their respective inner surfaces are in contact with the electrolyte on opposite sides of the diaphragm. The exterior portions of the insulated walls are formed with bearing surfaces so that the tanks can be arranged close together with the electrode walls parallel and the bearing surfaces bolted together so as to give a low resistance path for the electric current from tank to tank as well as a very strong mechanical construction. Nevertheless, any tank in the battery can be short-circuited, unbolted and, with its attached insulating supports, lifted from the battery by the ring bolt in the frame and removed to a convenient place for inspection or repair and as readily returned to its place in the battery when repairs have been completed.

The area of the electrode surface exposed to the electrolyte within the cell is predetermined in accordance with the desired amperage of current so as to give the desired current density. The thickness of the cell will be predetermined by the thickness of electrolyte required between the electrode surfaces and the diaphragm in order to protect the latter from disintegration or gas leakage and this is determined by the effective range which the gases or gas bubbles are projected from the surface of electrode by the electrical forces brought into play by the process of generating them.

It will be understood that while I speak of the insulated walls constituting the working electrodes as being plates, this does not necessarily imply that either the exterior or interior surfaces are perfectly plain, but only that they are substantially flat in outline. The inner surfaces particularly may be corrugated, grooved or otherwise patterned or molded so as to present a greater surface area to the electrolyte, and the exterior surface may be and frequently is formed or provided with ribs or outstanding bearing surfaces whereby they are adapted to be bolted to similar surfaces of adjacent cells either with or without the interposed spacing bar.

While I have fully shown and described all the details of a preferred embodiment of my invention, it will be obvious that various changes, omissions and substitutions of the various parts, as well as of arrangement, may be made without departing from the spirit of my invention.

I claim:

1. An electrolytic cell unit consisting of a flat, water-tight, metallic tank having two of its walls insulated from the body of the tank so that the inner surfaces of said insulated walls may be utilized as the working electrodes.

2. An electrolytic cell unit consisting of a flat, water-tight metallic tank and means for insulating opposite walls of the tank so that the inner surfaces of said insulated walls may be utilized as the working electrodes, said walls having both side edges extended laterally to form electric terminals, whereby both edges of both electrodes may be bolted to similar terminals of a similar cell unit.

3. An electrolytic cell unit, comprising a metallic body portion constituting the top, bottom and sides of the cell, in combination with metallic plates constituting two other walls of said cell, insulated from said body portion by interposed water-tight, gas-tight insulating material, whereby said insulated walls of the cell may be utilized as the working electrodes thereof.

4. An electrolytic cell of the class described, comprising a cast iron frame constituting the top, bottom and sides of the cell, an asbestos fabric diaphragm rigidly clamped against an inwardly projecting bead or flange, extending entirely around the opening within said frame, large area plate electrodes constituting the end walls of said cell and a gas-tight, water-tight, non-conducting medium between said plates and said frame.

5. An electrolytic cell of the class described, comprising large area conducting plates, an intermediate, relatively thin metallic frame to which said plates are bolted and water-tight, gas-tight insulation interposed between the plates and the frame.

6. An electrolytic cell of the class described, comprising large area conducting plates, an intervening, relatively thin metallic frame and interposed water-tight, gas-tight insulation between the plates and the frame, and a diaphragm of non-conducting but porous structure secured within said frame between said plates.

7. An electrolytic cell of the class described, comprising large area conducting plates, an intervening, relatively thin metallic frame and interposed water-tight, gas-tight insulation between the plates and the frame, together with a porous non-conducting diaphragm secured within said frame and parallel with said plates, said frame being of cast iron and having formed therein the inlets and outlets for supplying the electrolyte to the spaces on both sides of said diaphragm and for separately collecting and removing the gaseous products.

8. An electrolytic cell of the class described, comprising large area conducting plates, an intervening, relatively thin metallic frame and interposed water-tight, gas-tight insulation between the plates and the frame, together with a porous non-conducting diaphragm secured within said frame and parallel with said plates, said frame being of cast iron and having molded therein a passage from the bottom of the cell on one side of the diaphragm to the bottom of the cell on the other side of the diaphragm.

9. An electrolytic cell of the class described, consisting essentially of large area conducting plates, an intervening, relatively thin metallic frame and interposed water-tight, gas-tight insulation between the plates and the frame, together with a porous non-conducting diaphragm secured within said frame and parallel with said plates, said frame being of cast iron and having molded therein a passage from the bottom of the cell on one side of the diaphragm to the bottom of the cell on the other side of the diaphragm, and in the top thereof, a passage from the top of one side of the diaphragm to the top of the other side of the diaphragm.

10. An electrolytic cell of the class described, consisting essentially of large area conducting plates, an intervening, relatively thin metallic frame and interposed water-tight, gas-tight insulation between the plates and the frame, together with a porous non-conducting diaphragm secured within said frame and parallel with said plates, said frame being of cast iron and having molded in the top thereof a reservoir having independent passages to the interior of the cell on each side of the diaphragm, a collecting chamber having an entrance for electrolyte and gas and an exit for escape of electrolyte, both communicating with the space on one side of the diaphragm, another collecting chamber having an entrance for electrolyte and gas and an exit for electrolyte communicating with the space on the other side of the diaphragm.

11. An electrolytic cell of the class described, consisting of large area conducting plates and an intermediate porous, non-conducting diaphragm, in combination with means for holding said parts spaced apart and for maintaining a body of electrolyte between and in contact with the inner faces only of said plates.

12. A flat electrolytic cell unit, the flat sides of which consist of large conducting plates and a body portion which consists of a cast iron frame, in combination with a porous diaphragm within said frame and forming with said plates, two thin parallel compartments adapted to be filled with electrolyte, the thinness of said cell being determined by the minimum distance required for protecting the diaphragm from gaseous products formed upon and projected from the inner surface of said plates in the operation of said cell.

13. A flat electrolytic cell unit, the flat sides of which consist of large conducting plates and a body portion which consists of a cast iron frame, in combination with a porous diaphragm within said frame and forming with said plates, two thin parallel compartments adapted to be filled with electrolyte, the area of said plates being predetermined in accordance with the amperage and the resulting surface density of the current to be applied to said electrodes, and the thinness of said cell being determined by the minimum distance required for protecting the diaphragm from gaseous products formed upon and projected from the inner surface of said plates in the operation of said cell.

14. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the lower part of one compartment to the lower part of the other compartment around the separating medium, whereby the bodies of electrolyte in the two compartments may equalize their levels without flow of the electrolyte through said separating medium.

15. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the upper part of one compartment to the upper part of the other compartment around the separating medium, whereby the bodies of electrolyte in the two compartments may equalize their levels without flow of the electrolyte through said separating medium.

16. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with passages affording an open path circuit for free circulation of electrolyte from the bottom of one compartment to the bottom of the other compartment, and from the top of the latter compartment to the top of said first mentioned compartment, whereby the electrolyte in said compartments may equalize their specific gravities as well as their levels independently of any flow of electrolyte through said separating medium.

17. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the lower part of one compartment to the lower part of the other compartment around the separating medium, whereby the bodies of electrolyte in the two compartments may equalize their levels without flow of the electrolyte through said separating medium, said passage being formed and arranged with an entrance having a rearwardly and upwardly inclined surface whereby the light-weight gaseous product of the reaction may separate from the flowing electrolyte and may be guided backward into the compartment whence it came.

18. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the upper part of one compartment to the upper part of the other compartment around the separating medium, whereby the bodies of electrolyte in the two compartments may equalize their levels without flow of the electrolyte through said separating medium, said passage being formed and arranged with an entrance having a rearwardly and upwardly inclined surface whereby the light-weight gaseous product of the reaction may separate from the flowing electrolyte and may be guided backward into the compartment whence it came.

19. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with passages affording an open path circuit for free circulation of electrolyte from the bottom of one compartment to the bottom of the other compartment, and from the top of the latter compartment to the top of said first mentioned compartment, whereby the electrolyte in said compartments may equalize their specific gravities as well as their levels independently of any flow of electrolyte through said separating medium, said passages being each formed and arranged with an entrance having a rearwardly and upwardly inclined surface whereby the light-weight gaseous products of the reaction may separate from the flowing electrolyte and may be guided backward into the compartments whence they came.

20. In an apparatus for electrolytic decomposition of an electrolyte constituent, electrodes, an intervening electrolyte and a porous, closely woven asbestos fabric diaphragm in the electrolyte between the electrodes, constructed and arranged to divide the space and the body of electrolyte between the electrodes into two single-polarity opposite-polarity compartments and adapted to permit free electrolytic conduction of current therethrough while preventing passage of the gaseous products of either electrode into the compartment of the other electrode, in combination with a passage from the lower part of one compartment to the lower part of the other compartment around the diaphragm, whereby the bodies of electrolyte in the two compartments may equalize their levels without flow of the electrolyte through said diaphragm.

21. In an apparatus for electrolytic decomposition of an electrolyte constituent, electrodes, an intervening electrolyte and a porous closely woven asbestos fabric diaphragm in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the upper part of one compartment to the upper part of the other compartment around the diaphragm, whereby the bodies of electrolyte in the two compartments may equalize their levels without flow of the electrolyte through said diaphragm.

22. In an apparatus for electrolytic decomposition of an electrolyte constituent, electrodes, an intervening electrolyte and a porous closely woven asbestos fabric diaphragm in the electrolyte between the electrodes constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with passages affording an open path circuit for free circulation of electrolyte from the bottom of one compartment to the bottom of the other compartment and from the top of the latter compartment to the top of said first mentioned compartment, whereby the electrolyte in said compartments may equalize their specific gravities as well as their levels independently of any flow of electrolyte through said diaphragm.

23. In an apparatus for electrolytic decomposition of an electrolyte constituent, electrodes, an intervening electrolyte and a porous closely woven asbestos fabric diaphragm in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the lower part of one compartment to the lower part of the other compartment around the diaphragm, whereby the bodies of electrolyte in the two compartments may equalize their levels without flow of the electrolyte through said diaphragm, said passages being formed and arranged with an entrance having a rearwardly and upwardly inclined surface whereby the light-weight gaseous product of the reaction may separate from the flowing electrolyte and may be guided backward into the compartment whence it came.

24. In an apparatus for electrolytic decomposition of an electrolyte constituent, electrodes, an intervening electrolyte and a porous closely woven asbestos fabric diaphragm in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the upper part of one compartment to the upper part of the other compartment around the diaphragm, whereby the bodies of electrolyte in the two compartments may equalize their levels without flow of the electrolyte through said diaphragm, said passages being formed and arranged with entrances each having a rearwardly and upwardly inclined surface whereby the light-weight gaseous products of the reaction may separate from the flowing electrolyte and may be guided backward into the compartments whence they came.

25. In an apparatus for electrolytic decomposition of an electrolyte constituent, electrodes, an intervening electrolyte and a porous closely woven asbestos fabric diaphragm in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with passages affording an open path circuit for free circulation of electrolyte from the bottom of one compartment to the bottom of the other compartment and from the top of the latter compartment to the top of said first mentioned compartment, whereby the electrolyte in said compartments may equalize their specific gravities as well as their levels independently of any flow of electrolyte through said closely woven asbestos fabric diaphragm, said passages being each formed and arranged with an entrance having a rearwardly and upwardly inclined surface whereby the light-weight gaseous product of the reaction may separate from the flowing electrolyte and may be guided backward into the compartment whence it came.

26. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the lower part of one compartment to the lower part of the other compartment around the separating medium, whereby the bodies of electrolyte in the two compartments may equalize their levels without flow of the electrolyte through said separating medium, together with means whereby the level of the electrolyte is continuously maintained above the topmost portion of said separating medium and above the topmost portion of all electrode surfaces exposed within said compartment.

27. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the upper part of one compartment to the upper part of the other compartment around the separating medium, whereby the bodies of electrolyte in the two compartments may equalize their levels without flow of the electrolyte through said separating medium, together with means whereby the level of the electrolyte is continuously maintained above the topmost portion of said separating medium and above the topmost portion of all electrode surfaces exposed within said compartment.

28. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with passages affording an open path circuit for free circulation of electrolyte from the bottom of one compartment to the bottom of the other compartment, and from the top of the latter compartment to the top of said first mentioned compartment, whereby the electrolyte in said compartments may equalize their specific gravities as well as their levels independently of any flow of electrolyte through said separating medium, together with means whereby the level of the electrolyte is continuously maintained above the topmost portion of said separating medium and above the topmost portion of all electrode surfaces exposed within said compartment.

29. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the lower part of one compartment to the lower part of the other compartment around the separating medium whereby the bodies of electrolyte in the two compartments may equalize their levels without flow of the electrolyte through said separating medium, said passages being formed and arranged with an entrance having a rearwardly and upwardly inclined surface whereby the light-weight gaseous products of the reaction may separate from the flowing electrolyte and may be guided backward into the compartment whence it came, together with means whereby the level of the electrolyte is continuously maintained above the topmost portion of said separating medium and above the topmost portion of all electrode surfaces within said compartment.

30. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the upper part of one compartment to the upper part of the other compartment around the separating medium, whereby the bodies of electrolyte in the two compartments may equalize their levels without flow of the electrolyte through said separating medium, said passages being formed and arranged with an entrance having a rearwardly and upwardly inclined surface whereby the light-weight gaseous products of the reaction may separate from the flowing electrolyte and may be guided backward into the compartment whence it came, together with means whereby the level of the electrolyte is continuously maintained above the topmost portion of said separating medium and above the topmost portion of all electrode surfaces exposed within said compartment.

31. In an apparatus for electrolytic decomposition of an electrolyte constituent, electrodes, an intervening electrolyte and a porous separating medium in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with passages affording an open path circuit for free circulation of electrolyte from the bottom of one compartment to the bottom of the other compartment and from the top of the latter compartment to the top of said first mentioned compartment, whereby the electrolyte in said compartments may equalize their specific gravities as well as their levels independently of any flow of electrolyte through said separating medium, said passages being each formed and arranged with an entrance having a rearwardly and upwardly inclined surface whereby the light-weight gaseous products of the reaction may separate from the flowing electrolyte and may be guided backward into the compartment whence it came, together with means whereby the level of the electrolyte is continuously maintained above the top-most portion of said separating medium and above the topmost portion of all electrode surfaces exposed within said compartment.

32. In an apparatus for electrolytic decomposition of an electrolyte constituent, electrodes, an intervening electrolyte and a porous, closely woven asbestos fabric diaphragm in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the lower part of one compartment to the lower part of the other compartment around the diaphragm, whereby the bodies of electrolyte in the two compartments may equalize their levels without flow of the electrolyte through said diaphragm, together with means whereby the level of the electrolyte is continuously maintained above the topmost portion of said diaphragm and above the topmost portion of all electrode surfaces exposed within said compartment.

33. In an apparatus for electrolytic decomposition of an electrolyte constituent, electrodes, an intervening electrolyte and a porous closely woven asbestos fabric diaphragm in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the upper part of one compartment to the upper part of the other compartment around the diaphragm, whereby the bodies of electrolyte in the two compartments may equalize their levels without flow of the electrolyte through said diaphragm, together with means whereby the level of the electrolyte is continuously maintained above the topmost portion of said diaphragm and above the topmost portion of all electrode surfaces exposed within said compartment.

34. In an apparatus for electrolytic decomposition of an electrolyte constituent, electrodes, an intervening electrolyte and a porous closely woven asbestos fabric diaphragm in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with passages affording an open path circuit for free circulation of electrolyte from the bottom of one compartment to the bottom of the other compartment, and from the top of the latter compartment to the top of said first mentioned compartment, whereby the electrolyte in said compartments may equalize their specific gravities as well as their levels independently of any flow of electrolyte through said diaphragm, together with means whereby the level of the electrolyte is continuously maintained above the topmost portion of said diaphragm and above the topmost portion of all electrode surfaces exposed within said compartment.

35. In an apparatus for electrolytic decomposition of an electrolyte constituent, electrodes, an intervening electrolyte and a porous closely woven asbestos fabric diaphragm in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the lower part of one compartment to the lower part of the other compartment around the closely woven asbestos fabric diaphragm, whereby the bodies of electrolyte in the two compartments may equalize their levels without flow of the electrolyte through said diaphragm, said passages being formed and arranged with an entrance having a rearwardly and upwardly inclined surface whereby the light-weight gaseous products of the reaction may separate from the flowing electrolyte and may be guided backward into the compartment whence it came, together with means whereby the level of the electrolyte is continuously maintained above the topmost portion of said diaphragm and above the topmost portion of all electrode surfaces exposed within said compartment.

36. In an apparatus for electrolytic decomposition of an electrolyte constituent, electrodes, an intervening electrolyte and a porous closely woven asbestos fabric diaphragm in the electrolyte between the electrodes, constructed and arranged to divide the space and the body of electrolyte between the electrodes into two single-polarity, opposite-polarity compartments and adapted to permit free electrolytic conduction of current therethrough while preventing passage of the gaseous products of either electrode into the compartment of the other electrode, in combination with a passage from the upper part of one compartment to the upper part of the other compartment around the closely woven asbestos fabric diaphragm, whereby the bodies of electrolyte in the two compartments may equalize their levels without flow of the electrolyte through said diaphragm, said passages being formed and arranged with an entrance having a rearwardly and upwardly incline surface whereby the light-weight gaseous products of the reaction may separate from the flowing electrolyte and may be guided backward into the compartment whence it came, together with means whereby the level of the electrolyte is continuously maintained above the topmost portion of said diaphragm and above the topmost portion of all electrode surfaces exposed within said compartment.

37. In an apparatus for electrolytic decomposition of an electrolyte constituent, electrodes, and intervening electrolyte and a porous closely woven asbestos fabric diaphragm in the electrolyte between the electrodes, constructed and arranged to divide the space and the body of electrolyte between the electrodes into two single-polarity, opposite polarity compartments and adapted to permit free electrolytic conduction of current therethrough while preventing passage of the gaseous products of either electrode into the compartment of the other electrode, in combination with passages affording an open path circuit for free circulation of electrolyte from the bottom of one compartment to the bottom of the other compartment, and from the top of the latter compartment to the top of said first mentioned compartment, whereby the electrolyte in said compartments may equalize their specific gravities as well as their levels independently of any flow of electrolyte through said diaphragm, said passages being each formed and arranged with an entrance having a rearwardly and upwardly inclined surface whereby the light-weight gaseous products of the reaction may separate from the flowing electrolyte and may be guided backward into the compartment whence it came, together with means whereby the level of the electrolyte is continuously maintained above the topmost portion of said diaphragm and above the topmost portion of all electrode surfaces exposed within said compartment.

38. An electrolytic apparatus consisting of a flat metallic cell comprising a body portion and walls insulated therefrom and having their inner surfaces arranged as the working electrodes, the top of said body portion being formed with an interior space whereby the level of the electrolyte may be maintained above the topmost portion of said electrode surfaces.

39. An electrolytic cell of the class described, comprising a cast iron frame constituting the top, bottom and sides of the cell and having an inwardly projecting bead or flange extending entirely around the opening within said frame, a continuous rigid clamp coextensive with said bead or flange, an asbestos fabric diaphragm arranged with its edge portions rigidly clamped between said flange and clamp, large area electrodes constituting two of the walls of said cell below the level of the electrolyte therein, and a gas-tight, water-tight, non-conducting medium between said plates and said frame.

40. An electrolytic cell of the class described, comprising large area conducting plates, an intermediate relatively thin metallic frame to which said plates are bolted, and water-tight, gas-tight insulation interposed between the plates and the frame, the exposed inner surfaces of said plates being arranged below the level of the liquid in the cell cavity.

41. An electrolytic cell of the class described, comprising large area conducting plates, an intervening, relatively thin metallic frame and interposed water-tight, gas-tight insulation between the plates and the frame, and a diaphragm of non-conducting material but porous structure secured within said frame between said plates and below the level of the electrolyte in said cell.

42. An electrolytic cell of the class described, comprising large area conducting plates, an intervening, relatively thin metallic frame and interposed water-tight, gas-tight insulation between the plates and the frame, together with a porous diaphragm secured within said frame and parallel with said plates below the level of the electrolyte within the cell, said frame being of cast iron and having formed therein the inlets and outlets for supplying the electrolyte to the spaces on both sides of said diaphragm and for separately collecting and removing the gaseous products.

43. An electrolytic cell having opposite walls insulated from the body portion thereof and adapted to serve as electrodes, and a porous, gas-tight diaphragm supported by said body portion so as to divide the space and the body of electrolyte between the electrodes into two single-polarity, opposite-polarity gas compartments; said body portion having a reservoir with independent water-sealed connections to each of the compartments, independent separating chambers with water-sealed exits for each of said compartments, a gas vent connected below the level of the electrolyte in both said exit water seals, and an overflow stand pipe connected with said reservoir and with said exit water seals.

44. An electrolytic cell having opposite walls insulated from the body portion thereof and adapted to serve as electrodes, and a porous, gas-tight diaphragm supported by said body portion so as to divide the space and the body of electrolyte between the electrodes into two single-polarity, opposite-polarity gas compartments; said body portion having a reservoir with independent water-sealed connections to each of the compartments, independent separating chambers with electrolyte entrances and exists and with water-sealed exits for each of said compartments.

45. An electrolytic cell having opposite walls insulated from the body portion thereof and adapted to serve as electrodes, and a porous, gas-tight, diaphragm supported by said body portion so as to divide the space and the body of electrolyte between the electrodes into two single-polarity, opposite-polarity gas compartments; said body portion having a reservoir with independent water-sealed connections to each of the compartments, independent separating chambers with water-sealed exits for each of said compartments, a gas vent connected below the level of the electrolyte in both said exit water seals, and an overflow stand pipe connected with said reservoir and with said exit water seals, said body portion having in the bottom thereof a passage leading downward and across from the bottom of one compartment to the bottom of the other compartment.

46. An electrolytic cell having opposite walls insulated from the body portion thereof and adapted to serve as electrodes, and a porous diaphragm of the class described, supported by said body portion so as to divide the space and the body of electrolyte between the electrodes into two single-polarity, opposite polarity gas compartments, each of said compartments being provided with a water-sealed passage having an upwardly directed opening arranged above the level of the top of the diaphragm and above the level of the working surfaces of the electrodes whereby liquid may be automatically discharged into either compartment upon decreasing pressure or lowering level of the electrolyte therein and whereby a dangerous low level of the electrolyte may be indicated by blowing out of the gases through said opening.

47. In an electrolytic apparatus, a plurality of independent thin metallic tanks each containing a separate, non-communicating body of electrolyte, each tank comprising a thin cast iron frame, a porous diaphragm of the class described supported by said frame, and opposite insulated flat walls closing in the cavity within said frame having their respective inner surfaces exposed for contact with the electrolyte within said tank on opposite sides of said diaphragm and their exterior portions formed with bearing surfaces, said tanks being arranged close together with said electrode walls parallel and said bearing surfaces bolted together in electrical contact and mechanical engagement.

48. In an electrolytic apparatus, a plurality of independent thin metallic tanks each containing a separate, non-communicating body of electrolyte, each tank comprising a thin cast iron frame, a porous diaphragm of the class described supported by said frame, and opposite insulated flat walls closing in the cavity within said frame having their respective inner surfaces exposed for contact with the electrolyte within said tank on opposite sides of said diaphragm and their exterior portions formed with bearing surfaces, said tanks being arranged close together with said electrode walls parallel and said bearing surfaces bolted together in electrical contact and mechanical engagement, each such tank having separate insulating supports secured thereto and having suspending means at the top and in line with the center of gravity thereof.

49. In an electrolytic gas generator, a casing comprising two end casing members, a third member comprising a peripherally extending frame or wall insulated from said end casing members and adapted to form therewith a container for liquid, and means for securing said members together; and means for keeping the gases produced within said casing separate from one another; said third member having a chamber at its upper end and a tortuous liquid supply passage leading therefrom and discharging into the interior of said casing, a second chamber communicating with the interior of said casing, and a gas offtake conduit leading from said last mentioned chamber.

50. In an electrolytic apparatus, the combination of a plurality of cell units, each including a pair of separate plates forming electrodes, said plates being insulated from each other and in the assembly of the apparatus being arranged side by side, and means between each pair of adjacent cell units for detachably connecting both structurally and electrically the anode plate of one cell unit to the cathode plate of an adjacent cell unit, whereby each unit may be separately detached from the assembly of units.

Signed at New York city in the county of New York, and State of New York this 31st day of July, A. D. 1917.

EDWARD O. BENJAMIN.